Aug. 13, 1940.    C. PLEUTHNER    2,211,703
MEANS FOR CONTROLLING THE OPERATION OF GASOLINE DISPENSERS
Filed Feb. 9, 1940    2 Sheets-Sheet 1
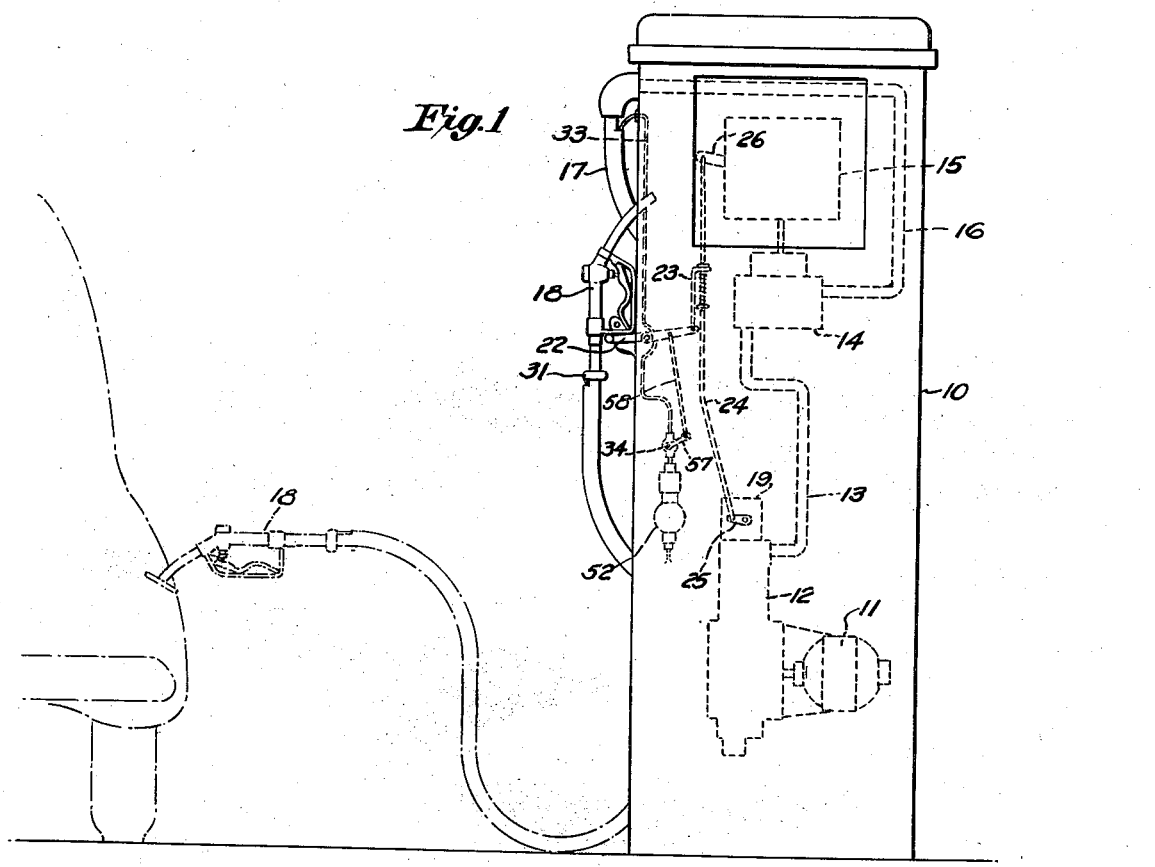
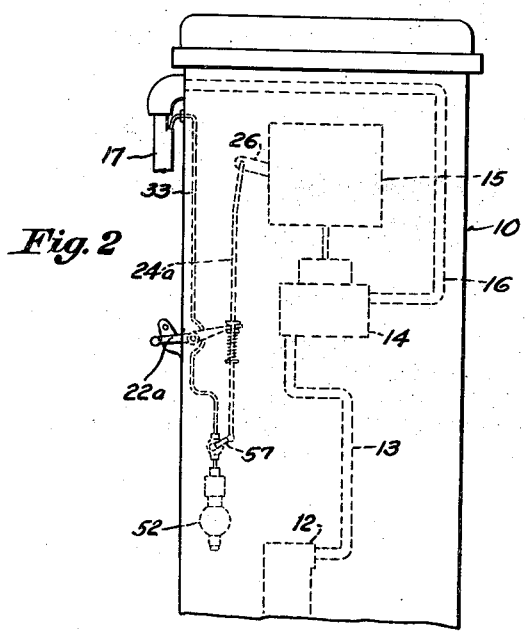
INVENTOR
Charles Pleuthner
BY
Albert R Henry
ATTORNEY

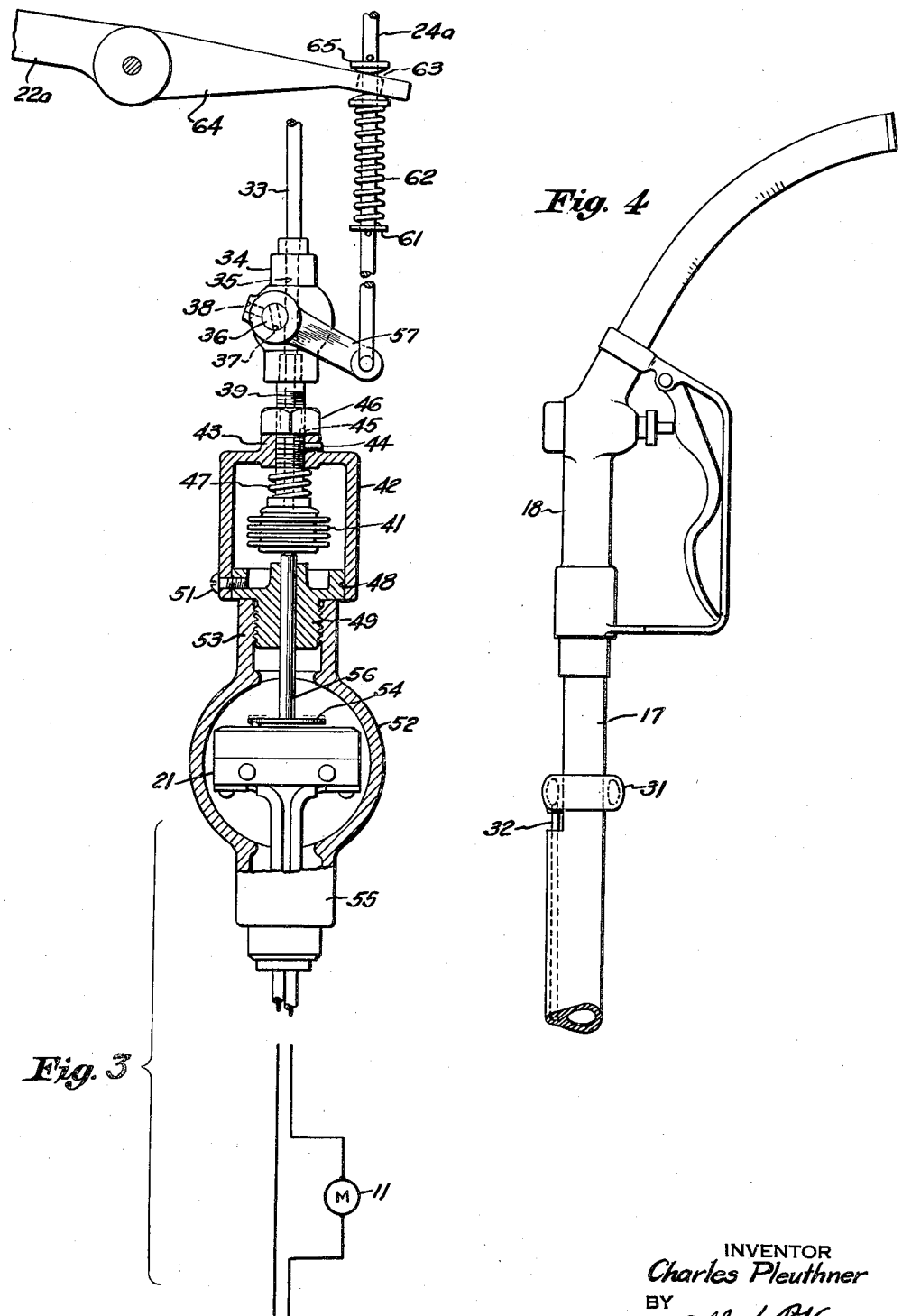

Patented Aug. 13, 1940

2,211,703

UNITED STATES PATENT OFFICE 2,211,703

MEANS FOR CONTROLLING THE OPERATION OF GASOLINE DISPENSERS

Charles Pleuthner, Salisbury, Md., assignor to Martin & Schwartz, Inc., Salisbury, Md.

Application February 9, 1940, Serial No. 318,121

7 Claims. (Cl. 221—95)

This invention relates to means for dispensing liquids, such as gasoline, from a local storage reservoir through a hose to the tank of an automobile, and it relates particularly to the provision of improved controlling means for conditioning the apparatus from a remote point.

The invention is herein described with reference to a typical motor-driven curbstand pump dispenser, in which a flow control device, such as a switch, is operatively conditioned only when the hose is removed from the hook, and when a manually accessible control member is actuated. The control member is of the type wherein pressure is generated by compression of atmospheric air in situ, when the dispensing is instituted, and the invention relates primarily to improvements in such pneumatic systems, together with the coordination thereof with a hose hook control.

One object of the present invention is to devise a pneumatic control system for a gasoline dispenser, wherein the air escape or bleed valve, through which the system is normally deconditioned and rendered inoperative, is disposed within the apparatus and is shielded from effects of rain and snow.

Another object of the invention is to devise a system in which the opening and closing of the vent of a pneumatic control is effected directly through the hose hook lever.

Another object of the invention is to devise a dual hook and remote pneumatic control coordinated with each other and with a single control switch or like instrumentality, so that the apparatus may be simplified and made less expensive, without loss of any desired safety or functional feature.

Another object of the invention is to devise a housing for a control device, such as a switch, and an actuator therefor, wherein the parts are functionally connected but are physically separated.

Other and further objects, and the modes now best known to me for achieving them in a practical way, will be apparent from the following description of particular embodiments of the invention, illustrated in the accompanying drawings, wherein:

Fig. 1 is an elevation of a gasoline dispenser, with certain parts disposed in the casing shown in dotted lines;

Fig. 2 is a fragmentary elevation, similar to Fig. 1, of a modified form of the invention, wherein a single control switch is contemplated;

Fig. 3 is a vertical section of a composite housing for a control switch and actuator therefor, as included in Figs. 1 and 2, the connection to the hose hook in the manner provided for in Fig. 2 being shown in elevation and on an enlarged scale; and Fig. 4 is a side view of a hose nozzle and a fragmentary view of the free end of the hose, showing in greater detail an impervious or air-tight pneumatic power generator.

In the embodiment of the invention shown in Fig. 1, there is included an upright casing 10 for the pumping and metering apparatus illustrated in dotted lines. An electric motor 11 is connected to a gasoline pump 12, whose suction line extends to a storage reservoir, not shown, for the gasoline. The pump discharges the liquid into a line 13 which is connected to a flow meter 14, adapted to operate a register 15 for indicating the number of gallons dispensed. The liquid flows from the meter into a conduit 16 which extends to the wall of the casing 10, where it is connected to a flexible delivery hose 17, provided at its end with a manually operated valved nozzle 18 which may be inserted in the filling opening of an automobile gasoline tank, as shown in dot and dash lines. When the system is conditioned for operation, the discharge through the nozzle may be controlled by manipulation of its valve.

The excitation of the motor 11, and hence the operation of the pump, is effected through a conventional electric circuit including, in this instance, an electric switch 19 disposed adjacent the motor and pump assembly, and a second electric switch 21 (also shown in Fig. 3) which is connected in the circuit in series with the switch 19. Thus, if either switch is open, current cannot flow to the motor, and the flow of gasoline is prevented.

In accordance with practices heretofore prevalent in the art, the opening and closing of the switch 19 is controlled by a hook lever 22, pivoted in the casing, and having one arm extending outwardly therefrom to support the hose nozzle when not in use. The opposite arm of the lever is connected, through links 23 and 24, to the crank 25 of the switch 19, in such fashion that, when the lever is depressed by the weight of the nozzle, the switch 19 is open. The link 24, shown in Fig. 1, extends upwardly to a lever 26 connected to the register 15, and which is released for movement only in the event the register has been reset to a zero position before instituting a dispensing operation. The nature of a reset-enforcing device is explained in my prior Patent No. 2,106,679, patented January 25, 1938, and therefore it is believed that this connection needs no further written description here.

In addition to the control of the apparatus which is obtained through the hose hook, the present invention contemplates another control, in which there is a pneumatic system for opening and closing the switch 21, but under the control of the hook, so that these two controls are interlocked. Positioned on the free or nozzle end of the hose 17 is an impervious compressible bulb 31 (Figs. 1 and 4) which, under manual compression, may generate pneumatic pressure from the air contained in the bulb. The bulb is connected to an air conduit 32 extending along the hose to its conduit end, where it merges into a tube 33, extending inside of the casing and leading to an air valve 34, the details of which are shown in Fig. 3.

The valve 34 is shown in the form of a simple plug valve having a fluid passage 35 and a rotary plug 36 formed with a port 37, which port is connected to or disconnected from the passage 35 in accordance with the positioning of the plug. The valve body is formed with a vent port 38 communicating with the atmosphere, and when the port 37 is aligned with the vent 38, it is also aligned with the main passage 35, thus opening the pneumatic system to the atmosphere. When the plug is turned, this opening is closed, and flow of fluid then is through the entire length of the passage 35.

The opposite end of the passage 35 is connected to a stem 39 which terminates in an expansible and contractible closed bellows 41, disposed in an individual housing 42. The bellows is utilized as an actuator for the switch 21, it being understood, of course, that when the bulb 31 is squeezed, with the vent 38 closed, the air pressure so generated will be transmitted to the actuator bellows to extend it, and thus provide energy which can be employed to operate the switch. When the pressure is released, the bellows contracts, permitting the switch 21 to open.

The housing 42 is a cylindrical member having an open lower end and a closed and drilled upper end 43 through which the bellows stem 39 extends with a running fit. The wall 43 is drilled to receive a key 44 extending into a keyway 45 which is cut into the externally threaded stem 39, and an adjusting nut 46 is threaded onto the stem above the housing. A helical spring 47 is disposed between the inner end of the wall 43 and the upper end of the bellows 41. With this construction, the positioning of the bellows 41 within the housing 42 may be adjusted within reasonable limits, and in a lineal direction, merely by turning the nuts 46. Since the stem 39 is held from rotation by the key 44, and since the spring 47 holds the nut 46 against the top of the wall 43, rotation of the nut causes the stem and attached bellows to slide in the opening in the top 43, thereby permitting the movable lower end of the bellows to be adjusted with respect to the body 42.

The lower end of the housing 42 is closed by a plug 48, having an external threaded boss 49 formed with a centrally disposed aperture, and which is secured to the housing 42 by a screw 51. A switch housing 52 is formed with an internally threaded boss 53 which is threaded onto the boss 49. The switch 21 is securely mounted within the housing 52, and it may here be noted that this switch is of a common commercial form, characterized by the relatively short throw of its operating lever 54, and the fact that, unless pressure is applied to the lever, the switch is in an open position. The circuit wires for the switch extend through a packed boss 55 on the opposite end of the housing 52, so that the switch is protected against moisture and is isolated from the other parts of the apparatus. A push pin 56 is disposed in the opening in the boss 49, and it extends from the lever 54 to the movable lower end of the bellows 41.

It will thus be seen that, upon the development of pneumatic pressure in the actuator bellows 41, sufficient to cause movement thereof, such motion is transmitted to the rod 56 to cause it to depress the lever 54, thereby closing the circuit switch 21, and permitting the flow of gasoline through the system. When the pneumatic pressure is released, then the bellows 41 contracts, and the switch 21 automatically opens.

It so happens, in practice, that it is difficult to make the various parts of the housing assembly with a high degree of precision, and, as the distance between the movable end of the bellows 41 and the switch lever 54 determines the effectiveness of operation, the bellows adjustment is provided to permit the parts to be brought into accurate operative relationship. Thus, assuming that the parts have been initially assembled in such fashion that the switch is held closed, or cannot be closed under the movement developed in the bellows, then the entire bellows, pin, and switch assembly can be varied, by moving the housings 42 and 52 with respect to the stem 39 and valve 34. If, for any reason, as when replacing worn parts, it is desired to disassemble the housings, such operation may be quickly effected by removing the screw 51, and the part to be replaced may then be removed without disturbing the other parts. When repairs have been effected, the new parts may be reassembled and properly adjusted in the manner just described.

As hereinbefore stated, the operativeness of the pneumatic system is made to depend upon the positioning of the hose hook lever 22. In the embodiment shown in Fig. 1, the plug 36 of the valve 34 is provided with a handle 57, the end of which is connected to the hook 22 by a link 58. When the outer end of the hook lever is depressed, the link 58 is pulled upwardly, thereby rotating the plug 36 into such position that the main passage 35 is connected directly to the atmosphere through the port 37 and vent 38. When the hook is moved, then the plug 36 is rotated to close the vent, thereby causing the generated pressure to flow to the actuator bellows 41 to close the switch 21.

It will thus be seen that the flow of gasoline through the apparatus is made to depend upon the positioning of the hook lever 22, which, when depressed by the weight of the hose, directly opens the switch 19, and also opens the air vent 38, so that the pneumatic system is also inoperative. When the nozzle is removed from the hook, the switch 19 is directly closed, and the pneumatic system is conditioned for operation, but it will not operate until the attendant squeezes the bulb 31, and which he does not do until he has the hose in a dispensing position, as shown by the dot and dash lines of Fig. 1. When the manual pressure is released, the pump motor stops, due to the opening of the switch 21, and without regard to the position of the hook lever 22.

In the modification shown in Fig. 2, the parts are, generally, the same, and therefore have been designated by like numerals. By reason of adequately protecting the switch 21, and interlocking its operation with the pneumatic system and the hose hook, the switch 19 may, if desired, be eliminated from the circuit. Thus, in Fig. 2, the switch 19, and links 23 and 58 have been omitted, and the link 24 has been extended directly to the valve handle 57, as indicated by the numeral 24a. Disposed on the link 24a, as best shown in Fig. 3, is a stop washer 61 on which is mounted a coil spring 62. The hook lever 22a is modified to provide an aperture 63 on its inner arm 64, and through which the link 24a extends. A second stop washer 65 is disposed on the link above the arm 64.

Unless the register has been reset to zero, there can be no downward motion of the lever 26, and unless such motion occurs, the link 24a cannot move. Therefore, the vent 38 of the valve 34 cannot be closed, and the pneumatic control remains inoperative, even though the bulb 31 be squeezed. Any movement of the hook lever 22a under this condition simply causes the compression of the spring 62, which restores the hook to its depressed position as soon as the lifting force is removed. If, however, the register is properly reset, then the link 26a may be moved, and upon raising the hook lever 22a, the force applied on the spring 62 forces the link down to close the vent 38.

This operation does not, of course, cause the motor 11 to start, for its circuit is taken through the switch 21, as before. If the pneumatic generator 31 is now compressed, however, then the actuator is extended to close the switch through its lever 54, in the manner heretofore described. In the event the register locking mechanism should be omitted, then the movement of the hook closes the vent 38 immediately, and thus conditions the system for operation through the pneumatic control.

While the invention has been described with respect to a gasoline dispenser in which the flow of gasoline is effected by means of a motor driven pump, it will be apparent to those skilled in the art that its principles are readily applicable to other types of dispensers in which flow control means are provided and that the specific forms herein illustrated may be modified without departure from the invention, as encompassed by the following claims.

I claim:

1. A gasoline dispenser comprising a casing, a pump in the casing, a motor connected to the pump to drive the same, an electric switch for the motor, a line receiving gasoline discharged by the pump, a flexible hose connected at one end to the line, a support for the free end of the hose when not in use, an actuator mounted adjacent the switch to effect closure thereof when said actuator is moved, a pneumatic generator disposed on the free end of the hose, a pneumatic tube connecting the generator and actuator, a vent within the casing, valve means for connecting said tube and vent, and means connecting the valve and hose support for opening said vent when the hose is on the hook and thereby rendering said actuator inoperative, said valve, when the hose is removed from the hook, being positioned to close said vent through said support means to condition the actuator system to close the switch.

2. A gasoline dispenser comprising a casing, a gasoline pump and driving motor disposed within the casing, a discharge line for the pump, a flexible hose disposed outside of the casing and connected at one end to said discharge line, a circuit switch for the motor, an impervious manually compressible pressure generator positioned on the hose adjacent the free end thereof, a fluid conduit extending from said generator to within the casing, a valve connected to said conduit, said valve being formed with a port for venting said conduit to the atmosphere, an actuator bellows connected to said valve, said bellows being disposed adjacent said switch to open and close the same in response to movement of said bellows, a support for the free end of the hose when not in use, and a link connecting said support and valve for opening the conduit to the atmosphere and thereby deconditioning said bellows when the hose is not in use, and for closing said vent when said hose is removed from the support.

3. A gasoline dispenser comprising a casing, a gasoline pump in the casing, a motor connected to the pump, a circuit switch for the motor, a discharge line from the pump, a hose disposed outside of the casing and connected at one end to the discharge line, a support on the casing for the free end of the hose, links connecting said support and switch to maintain the switch in open position when the hose is not in use, a pneumatic compressible and impervious generator disposed on the free end of the hose, a pneumatic conduit extending from said generator to within the casing, a bleed valve within the casing connected to said conduit, an extensible bellows connected to said valve, said valve having a passage for connecting said conduit and bellows and a vent port, a second switch disposed adjacent said bellows for operation thereby, said second switch being connected in said motor circuit, and a link connecting said hose support and second switch for opening the valve to atmosphere when the hose is on the support, whereby, when the hose is on its support, both switches are deconditioned from operation.

4. A gasoline dispenser comprising a casing, a gasoline pump in the casing, a motor in the casing connected to the pump, a discharge line for the pump, a hose connected to the discharge line, a support for the free end of the hose when not in use, a pneumatic generator mounted on the free end of the hose, a conduit extending from said generator to within the casing, a valve connected to the end of the conduit, said valve having a through passage therein and a bleed port and a valve for selectively opening and closing said passage and port, an extensible bellows connected to said through passage, a single circuit switch for said motor disposed adjacent said bellows for operation thereby, and a link extending from said hose support to said valve to open said bleed port when the hose is on the support and to connect said circuit and bellows when the hose is removed for a dispensing operation, whereby operation of the said single switch is subject to conjoint conditioning of both said support and said generator.

5. A gasoline dispenser comprising a casing, a gasoline pump mounted in the casing, a motor in the casing and connected to the pump, a discharge line from the pump extending to the casing wall, a flexible hose disposed outside of the casing and connected at one end to said discharge line, a nozzle on the free end of the hose, a support member mounted in the casing for supporting the nozzle end of the hose when not in use, a switch disposed in the casing and in the circuit for said motor, a manually compressible pneumatic generator disposed on the hose adjacent said nozzle, a pneumatic conduit extending from said generator to a point adjacent to but spaced from said switch, a valve in said conduit, said valve being adapted to be opened and closed to govern flow of pressure developed by compressing said generator, a bellows actuator connected to said valve, said bellows being disposed adjacent said switch to operate the same in response to movement of the actuator, and a link from the hose nozzle support to said valve, said link, when the nozzle is on the support, being moved to interrupt flow of pneumatically developed pressure from the generator to the actuator, and said link, when the nozzle is removed, being movable to connect said generator and actuator for remote manual operation of said switch.

6. In a gasoline dispenser including a casing having a hose supporting hook therein and a motor whose operation is controlled through said support and a remotely disposed power generator, a bleed valve connected to said generator, said valve being disposed in said casing, a power bellows housing connected to the valve, a bellows mounted in the housing and adapted to be selectively connected to said generator and to the atmosphere through said valve, a second housing connected to said first housing, a switch mounted in said second housing, said switch being connected in the circuit for said motor, movable means connecting the bellows and switch, and means connecting the hose hook and valve.

7. In a gasoline dispenser having a remotely operated control means, a housing, a power bellows in said housing, a stem on the bellows extending through one end of the housing, means for lineally adjusting said bellows in said housing through said stem, a second housing connected to said first housing opposite said stem, a wall dividing the housings, a switch mounted in the second housing, and a push pin extending through said wall and contacting upon adjustment of said bellows, both said bellows and said switch.

CHARLES PLEUTHNER.